July 2, 1957   S. McLARTY   2,797,510
ADVERTISING SPINNER OR FLUTTER MILL
Filed Feb. 27, 1956
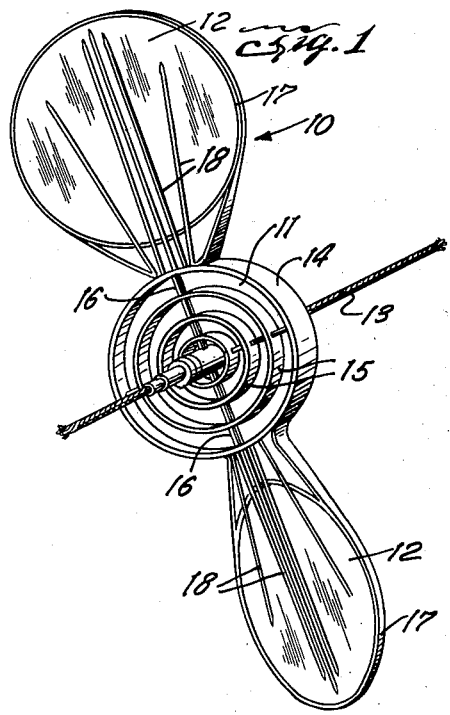
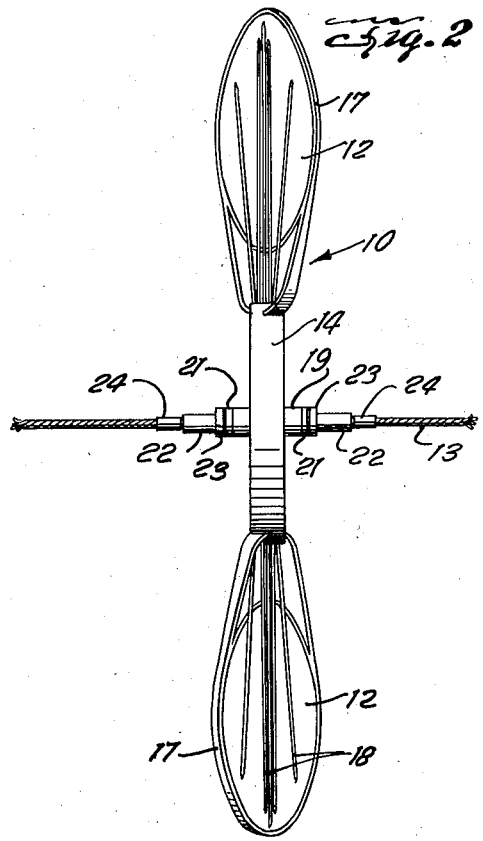
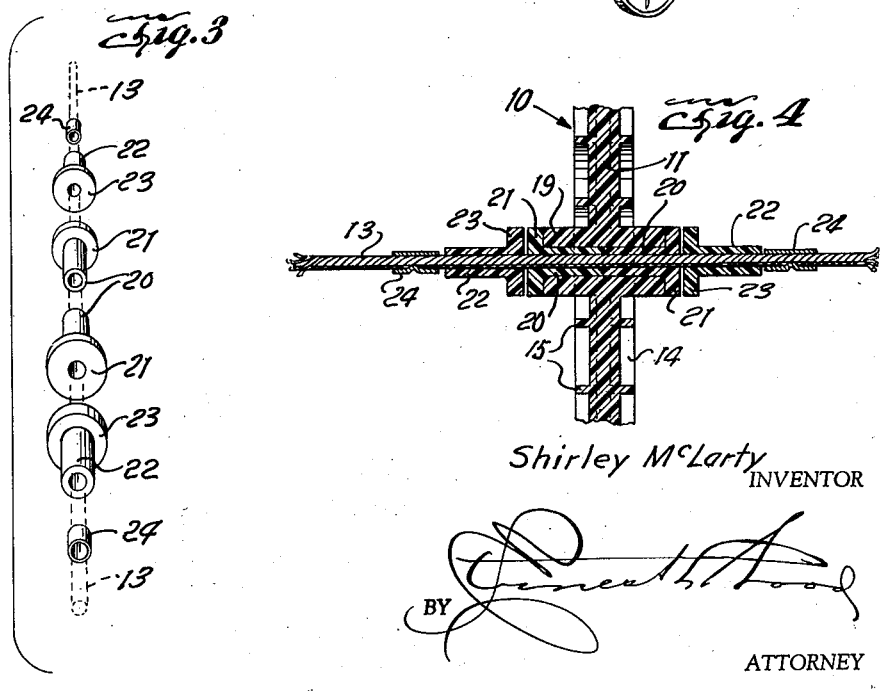
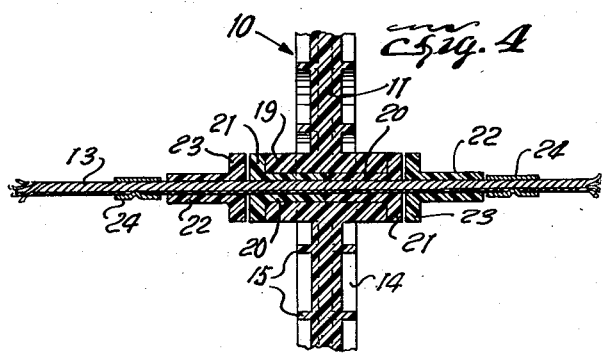
Shirley McLarty   INVENTOR
BY
ATTORNEY

United States Patent Office 2,797,510
Patented July 2, 1957

2,797,510

ADVERTISING SPINNER OR FLUTTER MILL

Shirley McLarty, Dallas, Tex., assignor to Plastex Molding Company, Dallas, Tex.

Application February 27, 1956, Serial No. 567,943

9 Claims. (Cl. 40—39)

This invention relates to advertising media and more particularly to a wind actuated spinner adapted to be suspended, with like devices, on a cable adjacent a place of business to gain the attention of prospective patrons.

It has long been the practice of persons dealing in certain types of merchandise, notably used automobiles, to create a carnival air about their premises by the ostentatious display of varicolored flags, pennants and other devices, usually strung on a cord or cable well above the ground to attract attention. These displays have become highly popular and some bladed, wind propelled devices for such use have been made in plastic and suspended on a cable as an attraction. However, it has been found that constant rotation of these devices on a cable, sometimes at high speed, soon wears out the bushing in the device through which the suspension cable passes.

It is the object of this invention to provide a novel form of wind actuated advertising spinner.

Another object of the invention is to provide a bladed display device formed with a center section equipped with a bearing constituting a part of this invention and designed to resist wear on the center section of the device.

Another object of the invention is to provide a bearing composed of axially aligned nylon bushings about which is molded the hub in the center section of the display device the said bushings rotatably embracing a suspension cable and held against endwise displacement by like bushings of a different type of plastic material surrounding the cable one contiguous with the outer end of each nylon bushing which latter, in turn, being restricted in its longitudinal displacement by a metal clip fastened to the cable on each side of the display device.

Other objects will appear as the description proceeds when considered with the annexed drawing wherein:

Fig. 1 is a perspective view of a display device and center bearing constructed according to the invention.

Fig. 2 is a side elevational view.

Fig. 3 is an exploded perspective view of the bearing assembly per se and

Fig. 4 is a fragmentary view of the device on a larger scale showing the bearing assembly in longitudinal cross section.

Continuing with a more detailed description of the drawing, reference numeral 10 denotes generally the advertising spinner which is of molded plastic, preferably polystyrene to form a circular center section 11 and diametrical wings or blades 12 which are arranged at a proper angle to be deflected by wind to cause the device to turn on the suspension cable 13.

The center section 11 is formed with a peripheral ring 14 and a plurality of progressively smaller concentric rings 15 and a series of radial ribs 16 (Fig. 1). These rings and ribs are both ornamental and functional in that they properly reinforce the center section to prevent warping or distortion in extremely hot weather and consequently prolong the usefulness of the device.

Each blade 12 has a peripheral rib 17 and a series of straight ribs 18 on each side thereof which extend from the center section 11 outwardly in divergent relationship toward the far edges of the blades 12. These ribs also are both ornamental and functional like the rings 15 and ribs 16 of the center section 11.

The body of the device 10 is injection molded and in the process, a hub 19 is formed whose length is greater than the overall thickness of the center section. To produce the bearing in the hub 19, a nylon bushing 20 is set in the mold in which the spinner 10 is formed, one in each end of the cavity producing the hub 19, with their adjacent or inner ends in abutting relationship. The hot plastic flows about these bushings, and against the circular heads 21 of the latter and when the spinner is released from the mold the bushings 20 are firmly embedded in the hub 19.

The cable 13 is passed through the bushings 20 in the manner shown in Fig. 4 and a pair of like bushings or sleeves 22 is threaded onto the cable, one on each side of the spinner 10 and each with its circular head 23 bearing against or in juxtaposition to the head 21 of an adjacent bushing 20. Adjacent the outer end of each bushing or sleeve 22 is a metal clip 24 of cylindrical shape which is pinched or dimpled onto the cable 13 to prevent its longitudinal displacement and to preclude like displacement of the spinner 10 itself.

The spinners 10 are made preferably of different bright colored plastic and are spaced apart on the cable 13 which is strung between suitable supports well above the ground. The wind strikes the blades 12 of the spinners 10, causing the latter to turn on the cable and attract the attention of passersby by their animation and coloring.

The nylon bearing formed by the axially aligned bushings 20 and the associated elements in their particular relationship shown and described permits the spinner to rotate freely and for longer periods of time than if the polystyrene hub 19 were in direct contact with the cable 13.

Manifestly, the construction as shown and described is capable of some modification and such modification as may be construed to fall within the scope and meaning of the appended claims is also considered to be within the spirit and intent of the invention.

What is claimed is:

1. As a new article of manufacture, an advertising spinner adapted for rotation on a cable comprising a plastic body having a circular center section and radial blades, a hub formed integrally in said center section having an axial bore, a nylon bushing extending into each end of said hub, the inner ends of said bushings being in juxtaposition within said hub and rotatably embracing said cable, a retaining bushing embracing said cable adjacent the outer end of each of said nylon bushings and a clip secured to said cable on each side of said spinner to hold the latter against longitudinal displacement on said cable.

2. As a new article of manufacture, an advertising spinner comprising a plastic body having a circular center section and radial blades, a hub formed integrally in said center section having an axial bore, a nylon bushing extending into each end of said hub, the inner ends of said bushings being in juxtaposition within said hub, a cable extending through said bushings for rotatably supporting said spinner and means engaging said bushings on each side of said spinner to hold the latter against longitudinal displacement on said cable.

3. The structure of claim 2, in which the means engaging said bushings consists of a sleeve embracing said cable, one on each side of said spinner and a clip secured to said cable adjacent the outer end of each of said sleeves.

4. As a new article of manufacture an advertising spinner comprising a plastic body having a center section, a hub in said center section, a bushing anchored in each end of said hub and extending into contiguity at the mid-section of said hub, a cable extending through said bushings and means engaging said cable adjacent the outer end of each of said bushings to hold said spinner against longitudinal movement on said cable.

5. The structure of claim 4 in which said center section is formed with a plurality of concentric rings between its periphery and said hub and a series of radial ribs extending from said hub to said periphery to reinforce said center section.

6. The structure of claim 4 in which the bushings each has a head of diameter substantially equal to that of said hub and in juxtaposition with an end of said hub and a sleeve surrounding said cable and engaging the head of an adjacent bushing at each end of said hub.

7. The structure of claim 6 and a metal clip fastened to said cable at the outer end of each of said sleeves.

8. In combination with a cable, an advertising spinner rotatably supported on the cable and comprising a plastic body having a circular center section and a pair of diametrically opposed blades extending radially outwardly from the center section, a hub formed integrally with the center section and having an axial bore, and a bearing comprising a bushing received in the bore for engagement with the cable, and means secured to the cable on opposite sides of the spinner for engagement with the spinner to prevent longitudinal displacement thereof with respect to the cable.

9. An advertising spinner as described in claim 8 in which the bearing comprises a plurality of preformed sections which collectively form a bushing having flanged end portions, the bearing being formed of self lubricating material having the characteristics of nylon and having the body of the spinner molded thereon.

References Cited in the file of this patent

UNITED STATES PATENTS

| | | |
|---|---|---|
| 722,070 | Zimmerman | Mar. 3, 1903 |
| 1,586,641 | Appelman | June 1, 1926 |
| 2,560,133 | Schroeter | July 10, 1951 |
| 2,675,283 | Thomson | Apr. 13, 1954 |
| 2,728,154 | Ross et al. | Dec. 27, 1955 |